United States Patent
Srinivas et al.

(10) Patent No.: US 9,554,375 B1
(45) Date of Patent: Jan. 24, 2017

(54) SECTOR SELECTION FOR COORDINATED MULTIPOINT BASED ON APPLICATION TYPE

(71) Applicant: Sprint Spectrum L.P., Overland Park, KS (US)

(72) Inventors: Shilpa Kowdley Srinivas, Brambleton, VA (US); Hemanth Pawar, Brambleton, VA (US); Krishna Sitaram, Chantilly, VA (US); Chunmei Liu, Great Falls, VA (US); Siddharth Oroskar, Overland Park, KS (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 75 days.

(21) Appl. No.: 14/702,391

(22) Filed: May 1, 2015

(51) Int. Cl.
*H04W 72/04* (2009.01)
*H04L 5/00* (2006.01)
*H04L 5/22* (2006.01)
*H04W 24/10* (2009.01)

(52) U.S. Cl.
CPC ........ *H04W 72/0413* (2013.01); *H04L 5/0035* (2013.01); *H04L 5/0053* (2013.01); *H04L 5/0073* (2013.01); *H04L 5/22* (2013.01); *H04W 24/10* (2013.01)

(58) Field of Classification Search
CPC . H04W 72/0413; H04W 24/10; H04L 5/0035; H04L 5/0053; H04L 5/0073; H04L 5/22
USPC .................................................. 370/280–336
See application file for complete search history.

(56) References Cited

U.S. PATENT DOCUMENTS

| | | |
|---|---|---|
| 2003/0161328 A1 | 8/2003 | Chase et al. |
| 2008/0253319 A1 | 10/2008 | Ji et al. |
| 2011/0306350 A1* | 12/2011 | Barbieri ................ H04B 7/024 455/450 |
| 2012/0039182 A1* | 2/2012 | Zhou ...................... H04L 1/1893 370/241 |
| 2012/0088455 A1 | 4/2012 | Love et al. |
| 2012/0282942 A1 | 11/2012 | Uusitalo et al. |

(Continued)

FOREIGN PATENT DOCUMENTS

| | | |
|---|---|---|
| EP | 2 385 653 A2 | 11/2011 |
| WO | 2013/138779 A1 | 9/2013 |
| WO | 2014/062104 A1 | 4/2014 |

OTHER PUBLICATIONS

The 3G 4G Blog: Coordinated Multi-point (CoMP) transmission and reception, 2010, (Feb. 26, 2015).*

(Continued)

*Primary Examiner* — Afsar M Qureshi

(57) ABSTRACT

Coordinated multipoint (CoMP) may involve coordination between multiple sectors to receive and/or process a given user equipment's uplink signal. Embodiments herein may help to intelligently select the particular sectors that should coordinate to provide uplink CoMP, based on the types of applications being served in sectors that are candidates to provide uplink CoMP. For example, a base station serving a primary sector in an CoMP group that includes two or more candidates from which to select a secondary sector sectors for uplink CoMP, may evaluate the application being served by traffic flows in these candidates, in an effort to select secondary sectors having lower-priority traffic flows.

20 Claims, 9 Drawing Sheets

(56) References Cited

U.S. PATENT DOCUMENTS

| | | | |
|---|---|---|---|
| 2013/0044722 A1* | 2/2013 | Kang | H04L 1/1861 370/329 |
| 2013/0083783 A1 | 4/2013 | Gupta et al. | |
| 2013/0114517 A1 | 5/2013 | Blankenship et al. | |
| 2013/0272170 A1* | 10/2013 | Chatterjee | H04W 28/02 370/280 |
| 2013/0301596 A1* | 11/2013 | Lee | H04B 7/0634 370/329 |
| 2013/0343273 A1 | 12/2013 | Barbieri et al. | |
| 2014/0056237 A1 | 2/2014 | Eriksson et al. | |
| 2014/0153534 A1* | 6/2014 | Kim | H04W 52/146 370/329 |
| 2014/0362720 A1* | 12/2014 | Kim | H04B 7/024 370/252 |
| 2015/0009931 A1* | 1/2015 | Yamazaki | H04B 7/024 370/329 |
| 2016/0105882 A1* | 4/2016 | Park | H04B 7/024 370/329 |

OTHER PUBLICATIONS

Irmer et al., "Coordinated Multipoint: Concepts, Performance, and Field Trial Results", IEEE Communications Magazine, 2011, 102-111.

The 3G4G Blog: Coordinated Multi-Point (CoMP) transmission and reception, 2010, 14 pages, printed Feb. 26, 2015, http://blog.3g4g.co.uk/2010/02/coordinated-multi-point-comp.html.

Mahalingam, "Coordinated Multipoint Tx and Rx", White Paper Radisys, Radisys Corporation, 2011, 7 pages.

Ghaleb et al., "QoS-Aware Joint Uplink-Downlink Scheduling in FDD LTE-Advanced with Carrier Aggregation", IEEE, 2014, pp. 111-115.

U.S. Appl. No. 14/531,628, filed Nov. 3, 2014.

"Carrier Aggregation—Activation and Deactivation of Secondary Calls," How LTE Stuff Works?, printed from the World Wide Web, dated Oct. 17, 2014.

Co-Pending U.S. Appl. No. 14/447,604, filed Jul. 30, 2014.
Co-Pending U.S. Appl. No. 14/543,465, filed Nov. 17, 2014.
Co-Pending U.S. Appl. No. 14/575,428, filed Dec. 18, 2014.
Co-Pending U.S. Appl. No. 14/575,455, filed Dec. 18, 2014.

\* cited by examiner

| Prime/Sub-Prime Classification | |
| --- | --- |
| Data Application/Protocol | Prime (P) / Sub-Prime (SP) |
| Web Browsing | SP |
| E-mail | SP |
| HTTPS | P |
| Video Streaming Application #1 | P |
| Video Streaming Application #2 | P |
| Video Streaming Application #3 | SP |
| Video Streaming Application #4 | P |
| Online Gaming Application | P |
| Video Streaming Application #5 | SP |
| Service-Provider Sponsored Video Streaming Application | P |

Fig. 4

SECTOR SELECTION FOR COORDINATED MULTIPOINT BASED ON APPLICATION TYPE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In OFDMA networks, such as LTE networks, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Uplink CoMP modes may involve interference rejection combining (IRC) or coordinated scheduling for purposes of reducing or preventing interference between transmissions from different user entities (UEs). Additionally or alternatively, various uplink CoMP modes may involve "joint reception" and/or "joint processing." Joint reception generally involves multiple base stations receiving an uplink signal that is transmitted by a given UE. Joint processing generally involves the multiple base stations that received the uplink signal from the UE, sending the respectively received signals or a decoded and/or processed version of the respectively received signals to one another, or just to a master base station in the group, such that the multiple received versions of the UE's transmission can be combined to improve reception and/or reduce interference.

Various types of joint processing have been implemented on the uplink. For example, joint processing on the uplink can be centralized. When a centralized CoMP mode is implemented on the uplink, the coordinating base stations may simply pass the entire received signal from a given UE on to a master base station, which then uses the received signals from multiple base stations to decode and/or process the signal from the given UE. Joint processing on the uplink can also be de-centralized to varying degrees. Specifically, when a decentralized CoMP mode is implemented on the uplink, a coordinating base station may decode and/or process the received signal from a given UE, and then send the decoded and/or processed signal from the given UE to the master base station. The master base station can then combine or select from the decoded and/or processed versions of the UE's transmission, which are sent to the master base station from one or more coordinating base stations that receive the UE's signal (and possibly a version of the UE's signal that is received at the master base station itself).

OVERVIEW

In the context of uplink coordinated multipoint (CoMP), a user equipment (UE) may be served by an eNodeB in a primary sector. Further, the primary sector may be part of pre-determined CoMP group, which includes a number of sectors. In cases where the CoMP group includes the primary sector and at least two other sectors, the serving eNodeB may consider the other sectors as candidate sectors to jointly process the uplink signal from a given eNodeB, and may perform an adaptive sector selection process by which a secondary sector is selected from the CoMP group to receive the uplink signal from the UE that is served in the primary sector. In current implementations, the secondary sector may be selected based on a comparison of received power levels of the UE's uplink signal in the candidate sectors. In particular, the candidate sector having the highest received signal strength for the UE's uplink signal may be selected as the secondary server to receive the UE's uplink signal.

However, due to the increased backhaul infrastructure needed (e.g., to communicate signals from an eNodeB serving a secondary sector to the eNodeB serving the primary sector), and/or due to increased access network utilization resulting from uplink CoMP (e.g., due to increased amounts of data flowing over the air interface), it may not always be feasible and/or desirable to select the secondary based on signal strength alone. For instance, if a candidate sector is serving to UEs with "prime" applications, it may be undesirable to burden the candidate sector with the additional processing and/or network utilization demands associated with uplink CoMP, even if the UE's signal strength in the candidate sector is higher than it is in the other candidate sectors. Accordingly, example embodiments may take into account the respective type or types of applications being served in candidate sectors when selecting a candidate sector as a secondary sector for uplink CoMP.

More generally, an exemplary method may involve a base station: (a) receiving, in a first sector, an uplink signal from a UE, wherein two or more other sectors are in a CoMP group with the first sector; (b) for each of one or more of the two or more other sectors, determining a corresponding application-based priority measure for the other sector, wherein the application-based priority measure is determined based on one or more types of applications having one or more service flows in the other sector; (c) using the one or more determined application-based priority measures as a basis for selecting at least one of the two or more other sectors in the CoMP group as a secondary sector; and (d) jointly processing the uplink signal from the UE, wherein the joint processing is based at least in part on the uplink signal received in the first sector and respective uplink signals received in each secondary sector.

In another aspect, an exemplary network component, such as an eNodeB, may include: (i) a radio-frequency (RF) communication interface configured to receive an uplink signal from a UE in a first sector of an access network, wherein two or more other sectors are in a coordinated multipoint (CoMP) group with the first sector; (ii) at least one backhaul communication interface for communicating with one or more second base stations; (iii) at least one processor; and (iv) a non-transitory computer readable medium comprising program instructions stored thereon that are executable by the at least one processor to: (a) for each of one or more of the two or more other sectors, determine a corresponding application-based priority measure for the other sector, wherein the application-based priority measure is determined based on one or more types of applications having one or more service flows in the other sector; (b) use the one or more determined application-based priority measures as a basis to select at least one of the two or more other sectors in the CoMP group as a secondary sector to provide uplink CoMP for the UE; and (c) jointly process the uplink signal from the UE, wherein the joint processing is based at least in part on the uplink signal received in the first sector and respective uplink signals received in each secondary sector.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 4 is table showing a classification scheme for various types of applications, according to an exemplary embodiment;

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more of various types of network entities may be implemented in various ways, such as by a processor executing program instructions, for instance.

I. Exemplary Network Architecture

Figure 1A:
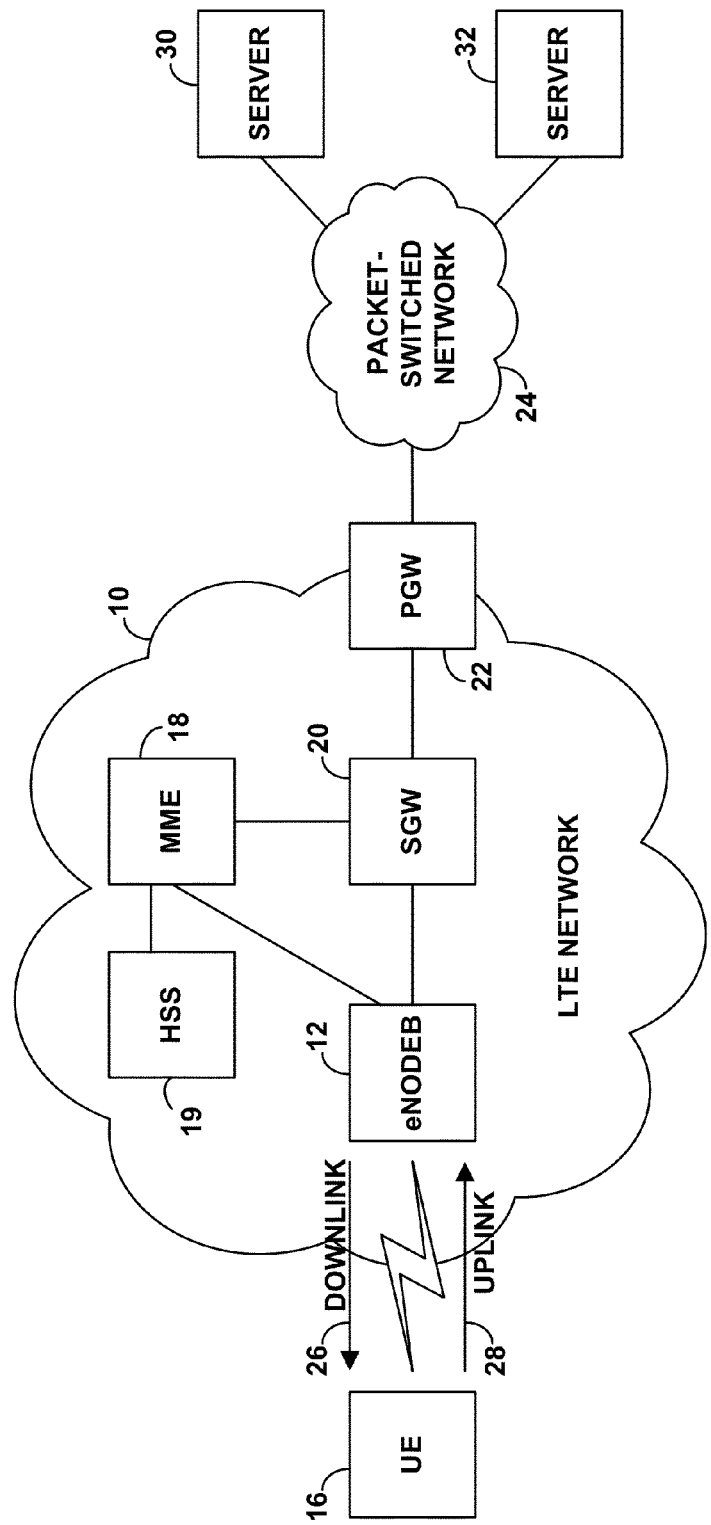
FIG. 1A is a simplified block diagram of a wireless communication system in which exemplary embodiments can be implemented.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-switched network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given sector served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

II. Deep Packet Inspection

In a further aspect of LTE, the eNodeB 12 may determine the type of content that will be communicated between the eNodeB 12 and the UE 16 in various ways. By way of example, the eNodeB 12 may accomplish this based on deep packet inspection (DPI) of one or more packets passing to or from the UE 16, and/or based on various associated signaling or other data.

As an example of this, the eNodeB 12 may read one or more such packets to determine a type of content being carried by such packet(s) and could consider that to be an indication of the type of content that will be communicated between the eNodeB 12 and UE 16. For instance, the eNodeB 12 could read from one or more such packets a network address of a remote entity with which the UE 16 is communicating and/or a transport port number associated with the type of content, and the eNodeB could map the network address and/or port number to a particular type of content.

To do this, the eNodeB 12 may include or have access to a table that maps various network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the type of content that will be communicated to or from the UE 16. Through this process, the eNodeB 12 might thereby determine that such packet data is streaming video content from a particular provider, streaming video content from another particular provider, streaming video content generally, gaming content, voice content, web content, and/or various other types of content such as those noted above for instance.

As another example, the eNodeB 12 could read the payload of one or more such packets and programmatically evaluate the data in the payload to project what type of content will be communicated between the eNodeB 12 and UE 16. For instance, if the payload carries SIP signaling or the like, the eNodeB could read that signaling to determine an SDP-based indication of type of content that will communicated to or from the UE 16, again possibly a type such as one of those noted above. Other examples are possible as well.

III. Coordinated Multipoint

As noted above, a network such as communication network 10 may implement various types of coordinated multipoint (CoMP) service, through which base stations (e.g., eNodeBs) may coordinate to improve uplink and/or downlink service. As noted above, CoMP schemes designed for coordinated transmission by base stations may be referred to as downlink CoMP modes, while CoMP schemes designed for coordinated reception may be referred to as uplink CoMP modes.

Figure 1B:
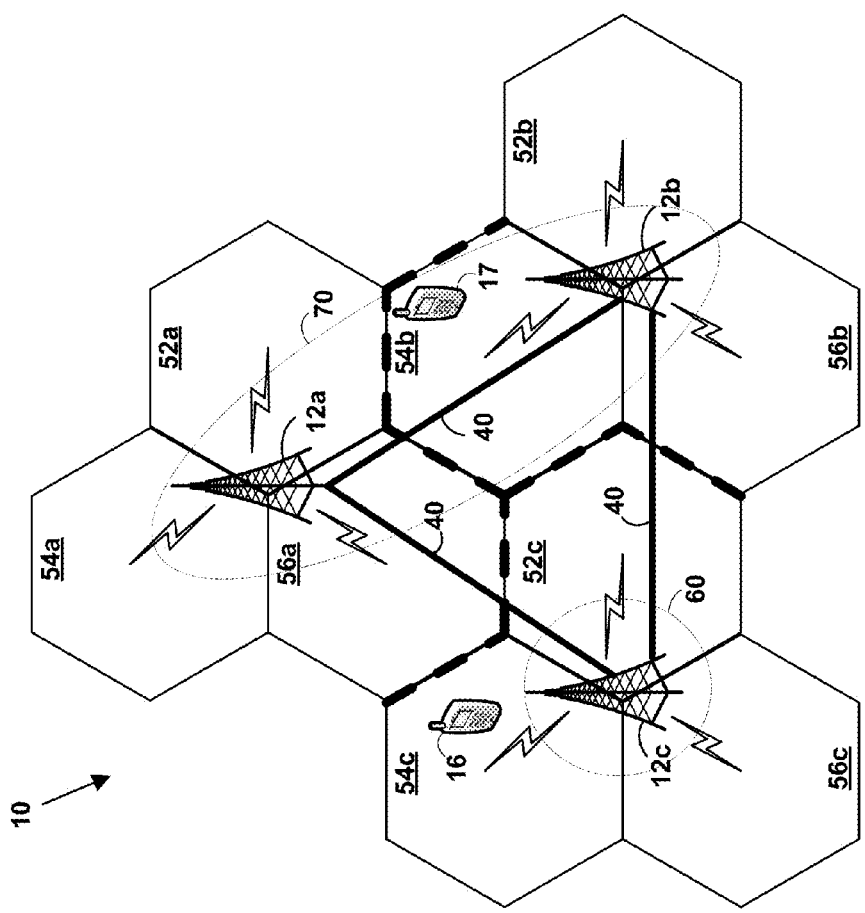
FIG. 1B is a simplified block diagram illustrating a portion of communication network in which CoMP schemes may be implemented.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible.

As shown, eNodeB 12a is serving three coverage areas or sectors 52a, 54a, and 56a, eNodeB 12b is serving three coverage areas or sectors 52b, 54b, and 56b, and eNodeB 12c is serving three coverage areas or sectors 52c, 54c, and 56c. Further, a UE 16 is operating in sector 54c, which is served by eNodeB12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, uplink CoMP may be implemented by a single base station, which provides service in multiple sectors. This type of CoMP scheme may be referred to as an "intra base station" or "intra-eNodeB" CoMP scheme. For example, eNodeB 12c may provide uplink CoMP by utilizing and/or combining uplink signals from a UE that are received at two or more of the sectors 52c, 54c, and 56c that are served by eNodeB 12c. In particular, eNodeB 12c may define a CoMP group 60 to include all its sectors 52c, 54c, and 56c. As such, eNodeB 12c may adaptively use joint processing techniques and/or interference rejection combining (IRC) techniques when the uplink signal from UE 16 is received at two or more of the sectors 52c, 54c, and 56c that it serves.

In other cases, uplink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 12a and 12c may provide uplink CoMP by utilizing and/or combining uplink signals from UE 17 that are received at two or more of the sectors 52a, 54a, 56a, 52b, 54b, and 56b that are served by eNodeBs 12a and 12b. (Those skilled in the art will understand that in the context of CoMP the "uplink signals" received at different base stations result from the same uplink signal that is transmitted by the UE, but are different because the transmission is "perceived" differently in the different sectors.)

When uplink CoMP involves multiple base stations (e.g., inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible.

In both intra-eNodeB and inter-eNodeB CoMP, there may be pre-defined groups of sectors, which may be referred to herein as "CoMP groups," or alternatively, as "CoMP clusters." The eNodeB or eNodeBs that serve the sectors in a CoMP group are configured to provide uplink CoMP using some or all of the sectors in the group.

Further, the coordinating eNodeB may determine which sectors from the CoMP group should be used to provide uplink CoMP for a given UE, at a given point in time. In particular, the coordinating eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities. In the case of intra-eNodeB uplink CoMP, this process of the eNodeB selecting a subset of sectors from the sectors in its uplink CoMP group to provide uplink CoMP for a particular UE may be referred to as "adaptive sector selection." Adaptive sector selection may also be applied in the context of inter-eNodeB CoMP. Specifically, in the context of inter-eNodeB CoMP adaptive sector selection may involve a serving eNodeB determining which eNodeBs, from the eNodeBs in its predefined CoMP cluster, should be utilized for joint processing of a particular UE's uplink signal.

In a further aspect, various types of uplink CoMP modes are possible. Further, as explained below, different uplink CoMP modes may have differing effects on the CPU load of the master base station and/or on the CPU load(s) at the other base station(s) with which the master base station coordinates to implement uplink CoMP. As will also be explained below, the uplink CoMP modes may additionally or alternatively have different effects on the backhaul network.

An interference rejection combining (IRC) mode may be used to reduce or cancel interference at a receiving base station (e.g., the master eNodeB in an inter-eNodeB CoMP cluster), or in the receiving sector, in the case of intra-eNodeB CoMP. When only IRC is implemented, there is very little coordination required between the base stations an inter-eNodeB CoMP group. Therefore, in the case of inter-base-station uplink CoMP, IRC-only does not significantly increase the CPU load at a coordinating base station, or increase the load on the backhaul network (e.g., on X2 links between base stations).

Some uplink CoMP schemes may use joint scheduling (also referred to as coordinated scheduling) in order to, e.g., reduce interference. When joint scheduling is implemented, only one UE at a time transmits the physical uplink shared channel (PUSCH) on a given resource block (RB), and the base stations coordinate to schedule the transmission. If only joint scheduling, then the load on the backhaul network (e.g., X2 links between base stations in an inter-eNodeB CoMP group) may be reduced significantly, because joint scheduling typically only requires that base stations exchange scheduling data.

When joint reception is implemented, multiple UEs can simultaneously transmit on the PUSCH, and may use the same RB when doing so. The PUSCHs may be received in multiple sectors, and in the case of inter-eNodeB CoMP, by multiple eNodeBs. The PUSCHs received in different sectors may be combined using various joint processing techniques, such as a mean squared error (MMSE) or zero forcing (ZF) process. Further, joint reception and joint processing may be combined with other types of uplink CoMP techniques, such as IRC, adaptive antennas, and/or multi-user detection schemes, in an effort to further improve performance and/or for other reasons.

In a further aspect, CoMP modes that include joint processing may be centralized or decentralized to varying degrees. Specifically, in the context of inter base station CoMP, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw I/Q data to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link between the coordinating base station and the master base station.

In a further aspect, it should be understood that the above descriptions of joint processing that utilizes signals received and communicated between eNodeBs, can be classified as inter-eNode uplink CoMP. The same concepts may be applied in the context of intra-eNodeB joint processing, with the difference being that a single eNodeB will use uplink signals received in two or more sectors it serves for joint processing, instead of using signals sent to the eNodeB by other eNodeBs.

IV. Time Division Duplexing

Depending on the air interface protocol and other factors, each coverage area in an access network may be arranged to operate in either a frequency division duplex (FDD) configuration or a time division duplex (TDD) configuration. In an FDD configuration, separate frequencies are used for downlink and uplink communication, so that downlink and uplink communication can occur simultaneously. In a TDD configuration, on the other hand, the same frequency is used for both downlink and uplink communication, and downlink and uplink communications are separated from each other by alternating use of the frequency over time.

As noted above, the air interface in each coverage area may further have a particular frame structure that defines periodically recurring time units in which information can be communicated between the base station and UEs. For example, a frame structure could define periodically recurring frames of 10 milliseconds, each consisting of a sequence of 10 subframes of 1 millisecond each. Moreover, the example frame structure could then further divide each subframe into a sequence of smaller time units, such as a pair of resource blocks for instance. Other example frame structures are possible as well.

In a TDD system, the air interface may define a single such frame structure for combined downlink/uplink use, with portions of each frame alternating between downlink and uplink in a defined sequence. For example, the first three subframes of each frame may be designated for downlink use, the next two subframes may be designated for uplink use, the next three subframes may be designated for downlink use, and the last two subframes may be designated for uplink use. In each frame of such a system, certain ones of the downlink subframes or portions thereof may again be designated to carry page messages and system overhead signaling such as a reference signal, and other downlink subframes or portions thereof may be designated to carry bearer traffic to served UEs. Further, certain ones of the uplink subframes or portions thereof may be designated to carry access messages and other overhead signaling, and other uplink subframes or portions thereof may be designated to carry bearer traffic to the serving base station.

Figure 2A:
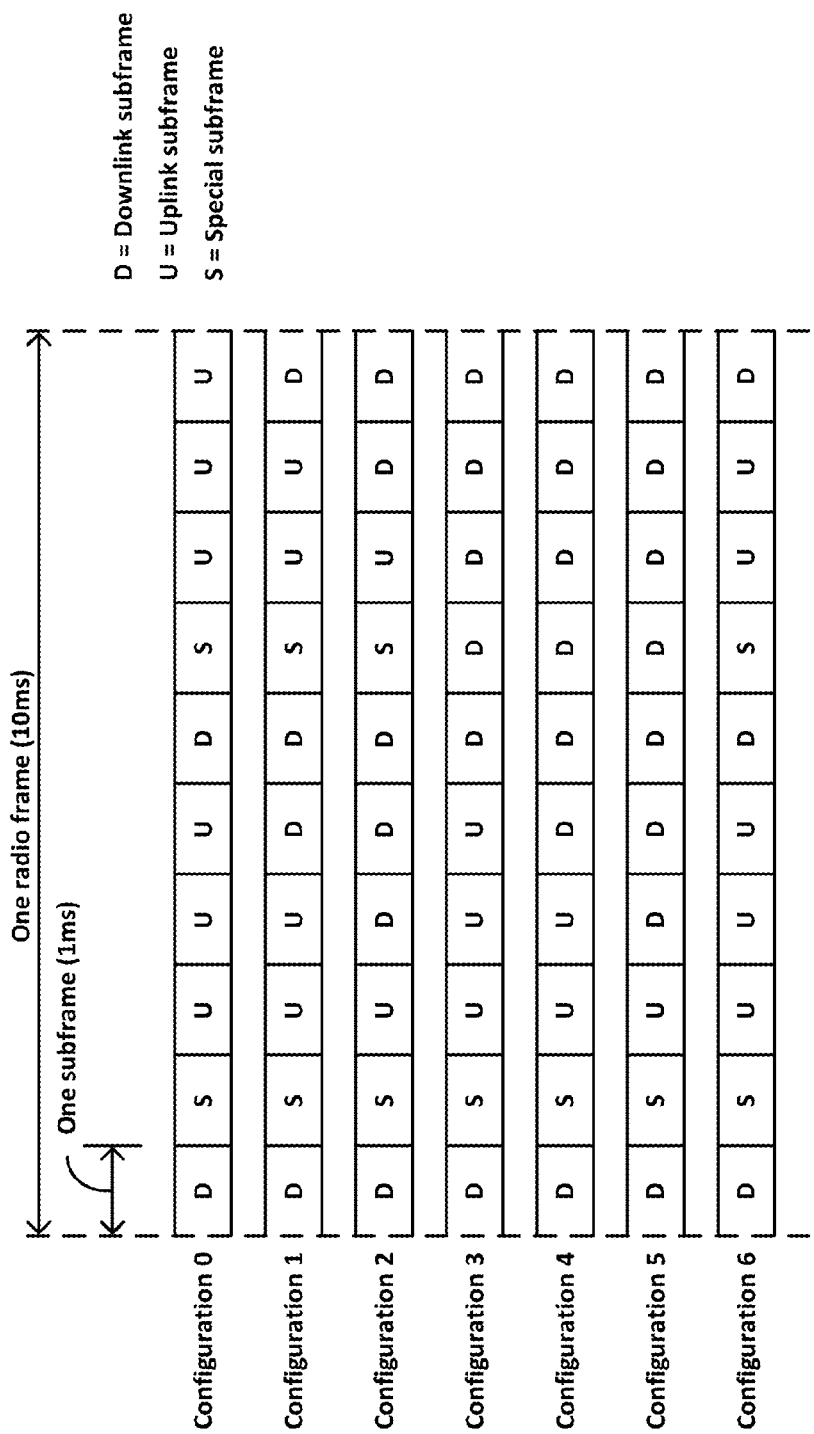
FIG. 2A illustrates an exemplary division of the uplink resources in a given wireless coverage area into resource blocks.

LTE defines seven different TDD frame structures, which differ from each other in terms of which subframes are set aside for downlink communication and which subframes are set aside for uplink communication. FIG. 2A depicts these frame structures, labeled as configurations 0 through 6. In each of these frame structures, subframes set aside for downlink communications are labeled as "D" and subframes set aside for uplink communication are labeled as "U". Further, in accordance with LTE, where a frame transitions over time from downlink to uplink, the frame includes a "special subframe" that is not used for either downlink or uplink communication, designed to give a UE time to make the transition to uplink communication. These special subframes are labeled as "S".

Each LTE base station may be configured to operate with a given one of these LTE frame structures and may broadcast an overhead specification of its frame structure so that UEs being served by the base station can operate with the applicable frame structure. For instance, the base station may broadcast an indication of its configuration (such as the configuration number or other configuration identifier) in a System Information Block #2 (SIB2) at a predefined position in a radio frame, and a served UE may read that SIB2 indication to determine the frame structure used by the base station.

In a further aspect, the number of subframes allocated for the uplink and downlink may vary between the different TDD frame configurations shown in FIG. 2A. Thus, as is explained in greater detail in section VII below, an exemplary embodiment may involve an eNodeB (and/or other network components) taking the TDD frame configuration in a sector into account when selecting uplink CoMP modes for UEs served in the sector.

V. Exemplary Network Components

Figure 2B:
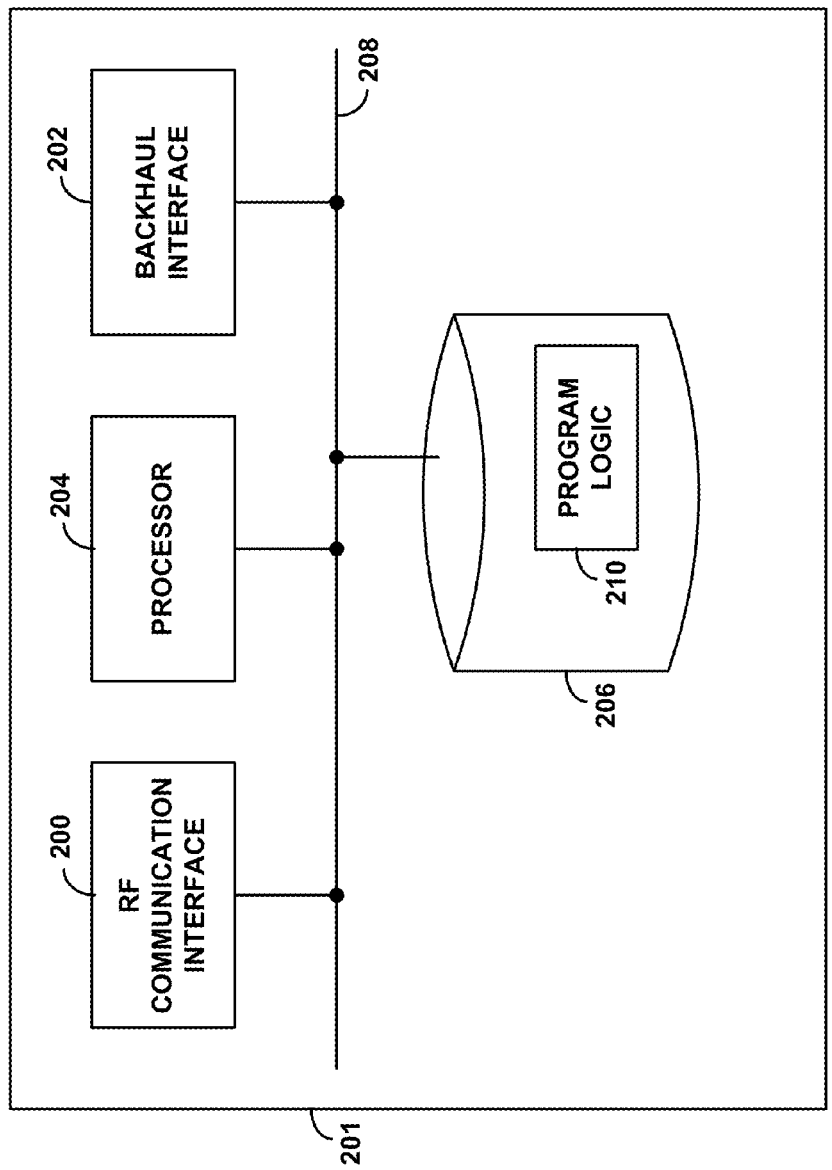
FIG. 2B is a simplified block diagram exemplifying a network component, according to an exemplary embodiment.

FIG. 2B is a simplified block diagram exemplifying a network component, according to an exemplary embodiment. In particular, FIG. 2B illustrates functional components that might be found in a network component 201 that is arranged to operate in accordance with the embodiments herein. As shown, the network component 201 may include a communication interface 200, a backhaul interface 202, a processor 204, and data storage 206, all of which may be communicatively linked together by a system bus, network, or one or more other connection mechanisms 208.

In practice, network component 201 may take the form of an eNodeB, or may take the form of another component of an LTE or CDMA network. Further, the illustrated components of network component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In network component 201, communication interface 200 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 202 may comprise any sort of communication link or mechanism enabling the network component 201 to exchange signaling and bearer data with other network entities, such as an X2 link, for instance. Further, processor 204 may comprise one or more processors (e.g., general purpose and/or special purpose processors), such as microprocessors for instance. Chipsets, ports, and/or other components for such backhaul communications are readily available and well known to those skilled in the art.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

In an exemplary embodiment, communication interfaces 200 may include an RF communication interface configured to receive an uplink signal from a UE in a first sector, where two or more other sectors are in a coordinated multipoint (CoMP) group with the first sector. Further, the network component may include program instructions stored in data storage 206, which are executable by processor 204 to: (a) determine, for each of one or more of the two or more other sectors, a corresponding application-based priority measure for the other sector, where the application-based priority measure is determined based on one or more types of applications having one or more service flows in the other sector, (b) use the one or more determined application-based priority measures as a basis to select at least one of the two or more other sectors in the CoMP group as a secondary sector to provide uplink CoMP for the UE, and (c) jointly process the uplink signal from the UE, wherein the joint processing is based at least in part on the uplink signal received in the first sector and respective uplink signals received in each secondary sector.

In an exemplary embodiment, the network component may be the serving eNodeB for a UE, and the determination as to which candidate sector(s) from the serving sector's CoMP group should be selected secondary sectors for uplink CoMP may be based at least in part on the types of applications that are being served in the candidate sectors. In particular, an eNodeB may use DPI, or otherwise receive an indication of the applications that are being served via existing service flows in a given candidate sector.

Note that a "service flow" should be understood to be the data traffic for a particular application that is communicated between a base station (e.g., an eNodeB) and a particular UE as part of an application session. As such, a given UE may have two or more service flows in its serving sector. For example, if a UE is engaged in a web browsing session, and is simultaneously streaming music in the background via a streaming audio session, the UE may be considered to have service flows for both the web browser application and the streaming music application. Other examples are also possible. Further, an eNodeB may identify particular service flows, and/or may determine characteristics of particular service flows, by using DPI to detect service flow identifiers (SFIDs) and or session identifiers in its data traffic. However, other techniques for identifying particular service flows and/or determining characteristics of particular service flows are also possible.

Figure 3:
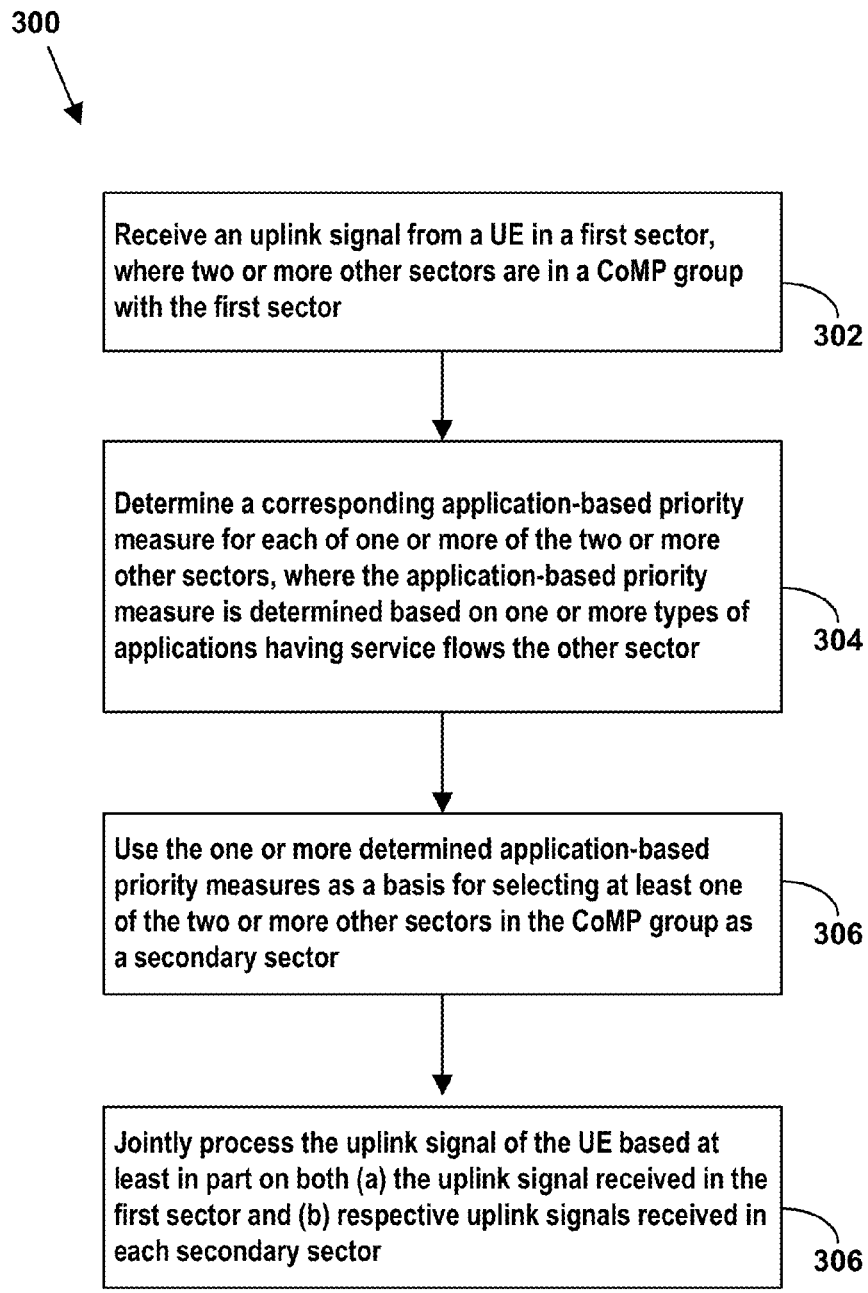
FIG. 3 is flow chart illustrating a method, according to an exemplary embodiment.

VI. Consideration of Secondary Sector Applications in Selection of CoMP Mode As noted above, exemplary methods may help to improve adaptive sector selection for uplink CoMP by taking into consideration the type or types of applications that are being served by candidate sectors from a COMP group. FIG. 3 is a flow chart illustrating a method 300, according to an exemplary embodiment. Exemplary methods such as method 300 may be implemented by an eNodeB, such as eNodeB 12, and/or by one or more other network entities. Further, other types of base stations and/or network entities, operable to provide service under protocols other than LTE, may also implement exemplary methods. For simplicity, however, exemplary methods may be described herein as being implemented by an eNodeB. Further, method 300 may be implemented for purposes other than those described herein, without departing from the scope of the invention.

As shown in block 302, method 300 involves an eNodeB receiving an uplink signal from a user equipment (UE) in a first sector, wherein two or more other sectors are in a CoMP group with the first sector. In an exemplary embodiment, the first sector may be the primary or serving sector for the UE. Further, the CoMP group that includes the first sector and the two or more other sectors may a pre-determined CoMP group. In other words, the CoMP group may be defined by the network architecture and/or may be defined by the service provider when installing the network. For example, in the case of intra-eNodeB CoMP, CoMP groups may simply include all the sectors served by the same eNodeB (and thus are a product of the network architecture). As another example, in the case of inter-eNodeB CoMP, a service provider may configure their network such that certain eNodeBs are included in a CoMP group with one another (meaning that sectors served by these eNodeBs are in also in the same CoMP group). Other examples are also possible.

Referring back to method 300, the eNodeB may also determine a corresponding application-based priority measure for each of one or more of the two or more other sectors, where the application-based priority measure is determined based on one or more types of applications having service flows in the other sector, as shown by block 304. The eNodeB may then use the one or more determined application-based priority measures as a basis for selecting at least one of the two or more other sectors in the CoMP group as a secondary sector, as shown by block 306. Note that the one or more determined application-based priority measures, which are utilized in block 306, correspond to the one or more of the two or more other sectors for which such indication was determined at block 304. The eNodeB may then jointly process the uplink signal of the UE based at least in part on both (a) the uplink signal received in the first sector and (b) respective uplink signals received in each secondary sector, as shown by block 308.

Note that when block 304 is performed (e.g., before the selection of secondary sectors is made at block 306), all of the other sectors in the same CoMP group as the first sector may be considered candidates for joint processing of the UE's uplink signal. As such, before the selection of secondary sectors is made at block 306, the other sectors may also be referred to herein as "candidate" sectors.

Further, at block 304, various techniques may be used to determine the application-based priority measure for a given candidate sector. For instance, in an exemplary embodiment, DPI may be utilized to determine a respective application type for each of one or more existing service flows in the second sector. Priority values may then be assigned to each service flow in the second sector based on the type of application that is being served via the service flow. For example, higher priority applications could be assigned a higher priority value and vice versa. Other techniques for assigning priority values to certain service flows are also possible.

In other embodiment, a priority classification may be assigned to each service flow based on the type of application that is being served via the service flow. For example, FIG. 4 is table 400 showing a classification scheme for various types of applications, according to an example embodiment.

More specifically, in the classification scheme shown in table 400, each application type is defined as either being "prime" (P) or "sub-prime" (SP). Column 402 includes a number of application types that could be served via a candidate sector, and column 404 indicates the classification for each of the application types shown in column 402. More specifically, in this classification scheme, web browsing is a sub-prime application type, e-mail is a sub-prime application type, and HTTPS is a prime application type. Further, various video streaming applications may be assigned different classifications (e.g., video streaming application 1 to 5 and service-provider sponsored video streaming application may be classified as prime, prime, sub-prime, prime, sub-prime, and prime, respectively). Yet further on an online gaming application may be classified as a prime application type.

It should be understood that the classification scheme shown in FIG. 4 is but one of many possible schemes, and that classification schemes with more than two classifications and/or different types of classifications are also possible.

Referring back to block 304 of method 300, the application-based priority measure may additionally or alternatively be determined based on one or more application-type statistics for service flows in a candidate sector. Examples of application-type statistics for a given candidate sector include, but are not limited to: (a) the total number of UEs using at least one service flow of a given application class in the sector, (b) the total number of service flows of a particular application class in the sector, (c) the total number of UEs using at least one service flow of a given application type in the sector, and/or (d) the total number of service flows of a particular application type in the sector, among other possibilities.

After determining the respective application-based priority measure for two or more candidate sectors, block 306 may be implemented to select at least one secondary sector to include in a joint-processing subset of the CoMP group, along with the UE's serving (i.e., primary) sector. In such an embodiment, the eNodeB uses signals received in this subset of sectors for joint processing of the UE's uplink signal. Further, in an exemplary embodiment, sectors from the CoMP group that are not selected at block 306 are thus excluded from the joint-processing subset. As a result, the serving eNodeB may refrain from including the signal received in the excluded sector for joint processing of the UE's uplink signal, even if the UE's uplink signal is received in an excluded sector.

In some embodiments, at block 306, the eNodeB may limit its selection to only one secondary sector. For example, the eNodeB may select the sector having the highest corresponding application-based priority measure as the lone secondary sector, which is utilized along with the serving sector to jointly process the UE's uplink signal. Other examples are also possible.

In other embodiments, more than one secondary sector may be selected at block 306. For example, the eNodeB may select every sector having greater than a threshold application-based priority measure as a secondary sector. Alternatively, the eNodeB may iteratively determine the application-based priority measure for each candidate sector, and select the first sector for which this measure is determined to be greater than a certain threshold (without calculating the application-based priority measure for candidate sectors that have yet to be evaluated). In a variation, the eNodeB may iteratively determine the application-based priority measure for each candidate sector, and select each sector having greater than a threshold measure, up to a certain maximum number of sectors (e.g., two, three, etc.).

Figure 5:
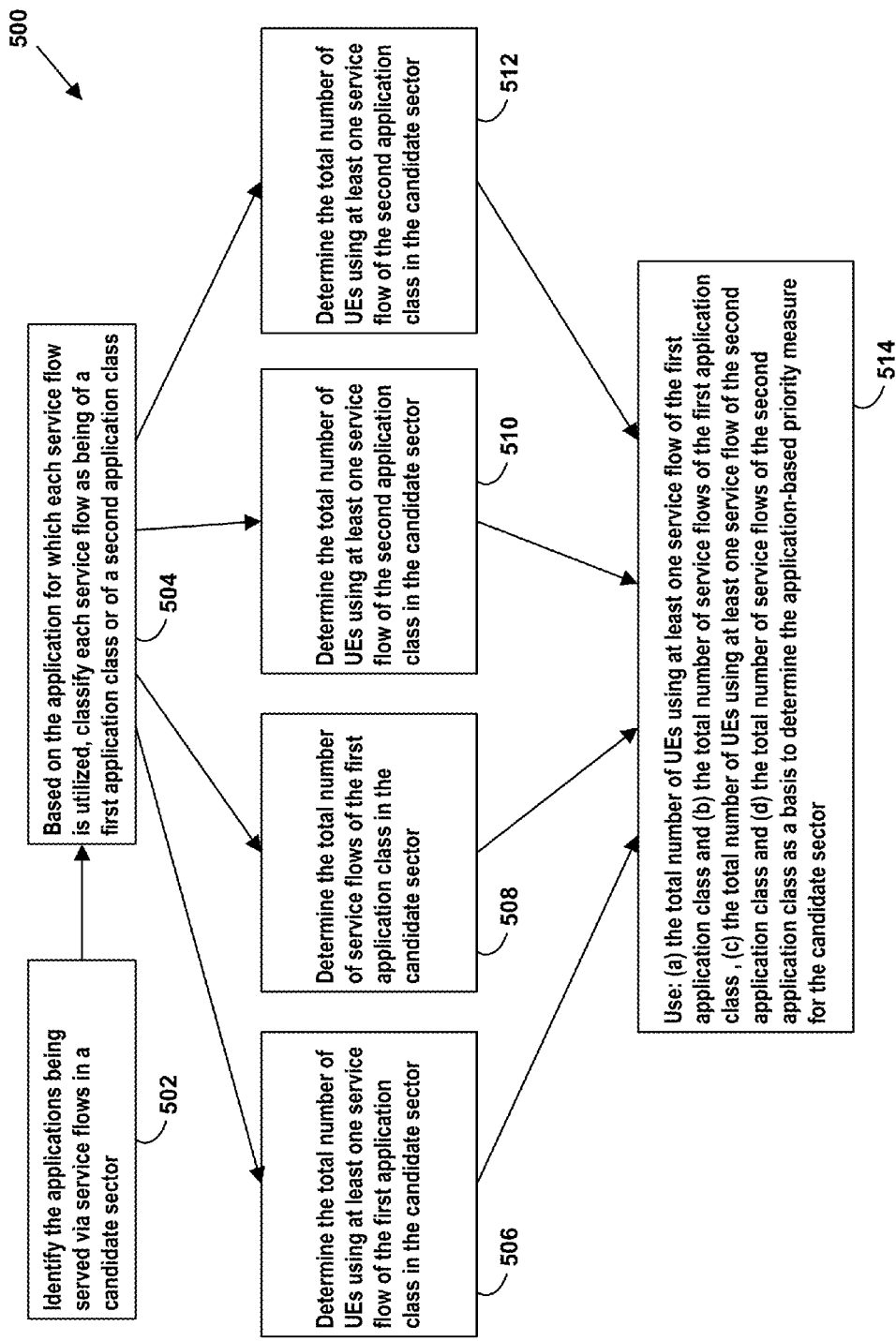
FIG. 5 is a flow chart illustrated a method for determining the corresponding application-based priority measure for a candidate sector, according to an exemplary embodiment.

A specific implementation of method 300 will now be described in reference to FIGS. 5 and 6. In particular, FIG. 5 is a flow chart illustrated a method 500 for determining the corresponding application-based priority measure for a candidate sector, according to an exemplary embodiment. Some or all of method 500 may be implemented at block 304 of method 300, for example. In this implementation the application-based priority measure may take the form of a weighting value for the corresponding candidate sector.

More specifically, block 502 involves an eNodeB identifying the applications being served via service flows in a candidate sector (e.g., by using DPI to inspect the data traffic in the candidate sector). The eNodeB may then classify each service flow as being of a first application class (e.g., prime) or of a second application class (e.g., sub-prime) based on the application for which the service flow is utilized, as shown by block 504. The eNodeB may then determine the total number of UEs using at least one service flow of the first application class (e.g., prime) in the candidate sector, as shown by block 506. (Note that this statistic can indicate the scenario wherein one UE has multiple concurrent service flows in a given sector.) Further, the eNodeB determines the total number of service flows of the first application class in the candidate sector, as shown by block 508. Additionally, the eNodeB may determine the total number of UEs using at least one service flow of the second application class (e.g., sub-prime) in the candidate sector, as shown by block 510. Yet further, the eNodeB may determine the total number of service flows of the second application class in the other sector, as shown by block 512.

The eNodeB may then use: (a) the total number of UEs using at least one service flow of the first application class and (b) the total number of service flows of the first application class, (c) the total number of UEs using at least one service flow of the second application class and (d) the total number of service flows of the second application class as a basis to determine the application-based priority measure for the candidate sector, as shown by block 514. In some embodiments, the eNodeB may use all four of these statistics, and possibly other factors as well, to determine the application-based priority measure. In other embodiments, the eNodeB may not use all four of the above statistics. For instance, the eNodeB might only calculate and/or use statistics related to the first application class, or might only calculate and/or use measures related to the second application class.

Note that in the context of intra-eNodeB CoMP, method 500 may be implemented by the serving eNodeB, which also serves the candidate sectors, and can thus has access to service flows in the candidate sectors. As such, the serving eNodeB can determine the application(s) served via service flows in each candidate sector, classify and determine application type statistics for those service flows, and determine the application-based priority measure using a method such as method 500. In the context of inter-eNodeB CoMP, method 500 may be implemented by each candidate eNodeB to determine its own application-based priority measure. Each candidate sector may then report its own application-based priority measure to the serving eNodeB for use in a method such as method 300. A candidate sector may automatically send periodic reports that indicate its application-based priority measure, and/or may determine and provide its application-based priority measure to the serving eNodeB upon request.

As noted above, in some embodiments, the application-based priority measure may take the form of a weighting value for the corresponding candidate sector. For example, referring back to FIG. 1B, consider a scenario where eNodeB 12c is serving UE 16 in sector 54c, and is implementing intra-eNodeB uplink CoMP with a CoMP group that includes sectors 52c, 54c, and 56c. In this scenario, eNodeB 12c may implement method 500 to determine weighting values for sectors 52c and 56c, such that one these sectors can be selected as a secondary sector to provide uplink CoMP for UE 16.

More specifically, eNodeB 12c may classify service flows as either prime or subprime, and perform block 514 to determine a weighting value for each candidate sector 52c and 56c. eNodeB 12c may then determine, for each candidate sector 52c and 56c: (a) the total number of UEs that are being served with at least one prime service flow in the sector ($UE_P$), the total number of prime service flows being served in the candidate sector ($SF_P$), the total number of UEs that are being served with at least one sub-prime service flow in the sector ($UE_{SP}$), and the total number of subprime service flows being served in the candidate sector ($SF_{SP}$). As such, eNodeB 12c may then calculate the weighting value (Sector_Weight) for a given candidate sector 52c and 56c using Eq. 1 below, where $\alpha, \beta, \gamma, \delta$ are constants that indicate a respective weight to be given to $UE_P$, $SF_P$, $UE_{SP}$, and $SF_{SP}$, respectively, when determining the overall weight for the candidate sector:

$$\text{Sector\_Weight}=(\alpha*UE_P)+((\beta*SF_P)-(\gamma*UE_{SP})-(\delta*SF_{SP}) \quad \text{Eq. 1}$$

This process may then be repeated for each candidate sector, such that the Sector_Weights of the candidate sectors can be compared, and one of the candidate sectors can be selected as a secondary sector for uplink CoMP.

Figure 6:
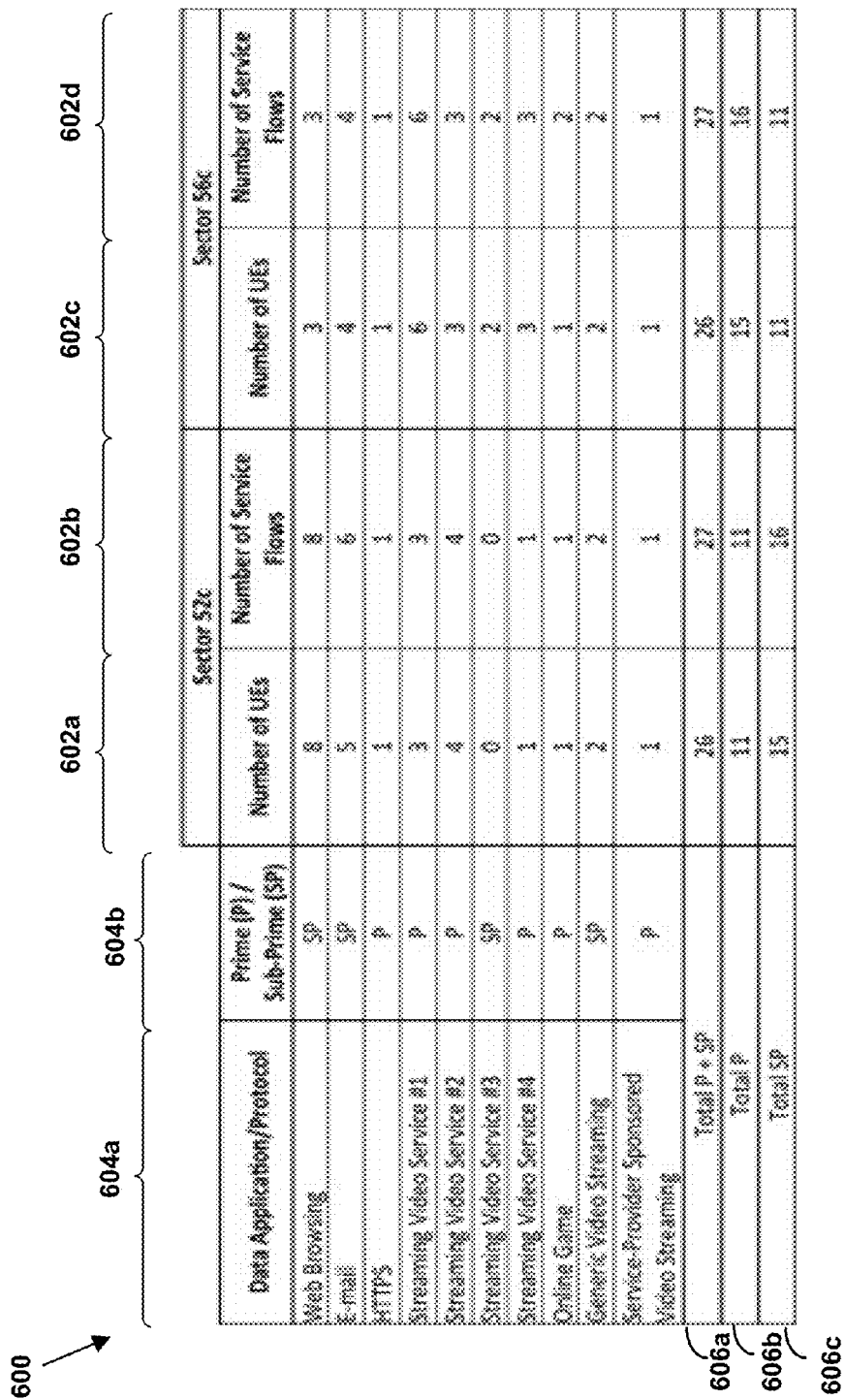
FIG. 6 is a table 600 showing classifications and statistics that may be determined in an example scenario, according to an exemplary embodiment.

FIG. 6 is a table 600 showing classifications and statistics that may be determined in an exemplary scenario. Specifically, table 600 shows classifications and statistics that may be determined using Eq. 1 as described above. In this scenario, eNodeB 12c may use method 500 to classify service flows, determine service flow statistics, and determine a weight for in each of the other sectors 54c and 56c in the CoMP group served by eNodeB 12c.

In particular, column 604a indicates various application types that were detected by the eNodeB in service flows of sector 52c and/or 56c. Each row in column 604b indicates the classification for the corresponding application type in the corresponding row of column 604a; in this example, either prime (P) or sub-prime (SP). Each row in column 602a indicates the total number of UEs in sector 52c that are being served by the corresponding application type indicated in column 604a, while each row in column 602b indicates the total number of service flows, in sector 52c, of the corresponding application type indicated in column 604a. Similarly, each row in column 602c indicates the total number of UEs in sector 56c that are being served by the corresponding application type indicated in column 604a, and each row in column 602d indicates the total number of service flows, in sector 56c, of the corresponding application type indicated in column 604a.

Further, the per-application-type statistics in each column 602a to 602d may be summed in row 606a of each of these columns. As such, row 606a of column 602a indicates the total number of UEs in sector 52c that are being served by all application types (both prime and non-prime); row 606a of column 602b indicates the total number of service flows of all application types (both prime and non-prime), in sector 52c; row 606a of column 602c indicates the total number of UEs in sector 56c that are being served by all application types (both prime and non-prime); and row 606a of column 602d indicates the total number of service flows of all application types (both prime and non-prime) in sector 56c.

Further, row 606b of column 602a indicates the total number of UEs in sector 52c that are being served by at least one prime application; row 606b of column 602b indicates the total number of service flows across all prime application types in sector 52c; row 606b of column 602c indicates the total number of UEs in sector 56c that are being served by at least one prime application; and row 606b of column 602d indicates the total number of service flows across all prime applications in sector 56c.

Yet further, row 606*b* of column 602*a* indicates the total number of UEs in sector 52*c* that are being served by at least one sub-prime application; row 606*b* of column 602*b* indicates the total number of service flows across all sub-prime application types in sector 52*c*; row 606*b* of column 602*c* indicates the total number of UEs in sector 56*c* that are being served by at least one sub-prime application; and row 606*b* of column 602*d* indicates the total number of service flows across all sub-prime applications in sector 56*c*.

Once an eNodeB has determined some or all of the statistical information shown in table 600, the eNodeB 12*c* may proceed to use Eq. 1 to determine a weighting value for each candidate sector 52*c* and 56*c*. For instance, consider the scenario where the where the constants that indicate the respective weights to be given to $UE_P$, $SF_P$, $UE_{SP}$, and $SF_{SP}$ are set as follows:

$\alpha=1$;
$\beta=2$;
$\gamma=1$;
$\delta=0.5$

In this scenario, the eNodeB may input the values indicates in rows 606*b* and 606*c* into Eq. 1 and determine the weighting values for the candidate sectors as follows:

$$Sector\_Weight_{52c}=(1*11)+(2*11)-(1*15)-(0.5*16)=10$$

$$Sector\_Weight_{56c}=(1*15)+(2*16)-(1*11)-(0.5*11)=14.5$$

Since the weighting value for sector 52*c* (10) is less than the weighting value for sector 56*c* (14.5), the eNodeB 12*c* may select sector 52*c* as the secondary server to participate in joint processing of the uplink signal from UE 16. Note that in this example, the individual weights given to $UE_P$, $SF_P$, $UE_{SP}$, and $SF_{SP}$ are set such that the weighting value tends to increase as the number of UEs that are being served by at least one prime application increases and/or as the total number of prime service flows increases. Thus, by selecting the sector with the lower weighting value, eNodeB 12*c* avoids adding the processing and/or bandwidth burden of uplink CoMP on the sector that is serving more prime service flows. Of course, other criteria for selecting the secondary sector for uplink CoMP are also possible.

In a further aspect, some embodiments may consider other factors, in addition to application-based priority measures, when selecting secondary sectors. For instance, an eNodeB may determine and/or receive indications of the respective channel conditions in the candidate sectors, and use the respective channel conditions as a further basis for selecting a secondary sector or sectors.

As a specific example, the eNodeB may determine a respective received-power indication for uplink communications from the UE in two or more candidate sectors. The eNodeB may then use the respectively determined received-power indications as a further basis for the selecting of at least one of the other sectors as a secondary sector. To do so, the eNodeB may filter out a sector or sectors having less than a threshold level of received power. Alternatively, the eNodeB may use both the received-power indication along with application-based priority measure for a given candidate sector to determine a weighting value for the sector, which can be compared to weighting values for other candidate sectors in order to select a candidate sector or sectors as secondary sectors.

VII. Consideration of TDD Frame Configuration in Selection of an Uplink CoMP Mode In yet another aspect, a primary eNodeB in a CoMP group may take into account the TDD frame configuration that is implemented in a serving sector of a UE, in order to select an uplink CoMP mode for a UE that is served in the serving sector. Then, in the event that the selected uplink CoMP mode involves uplink CoMP being enabled for the UE, the serving eNodeB may apply an exemplary method such as that described in reference to FIG. 3, to select the secondary eNodeB or eNodeBs to include in the CoMP group for the UE.

Figure 7:
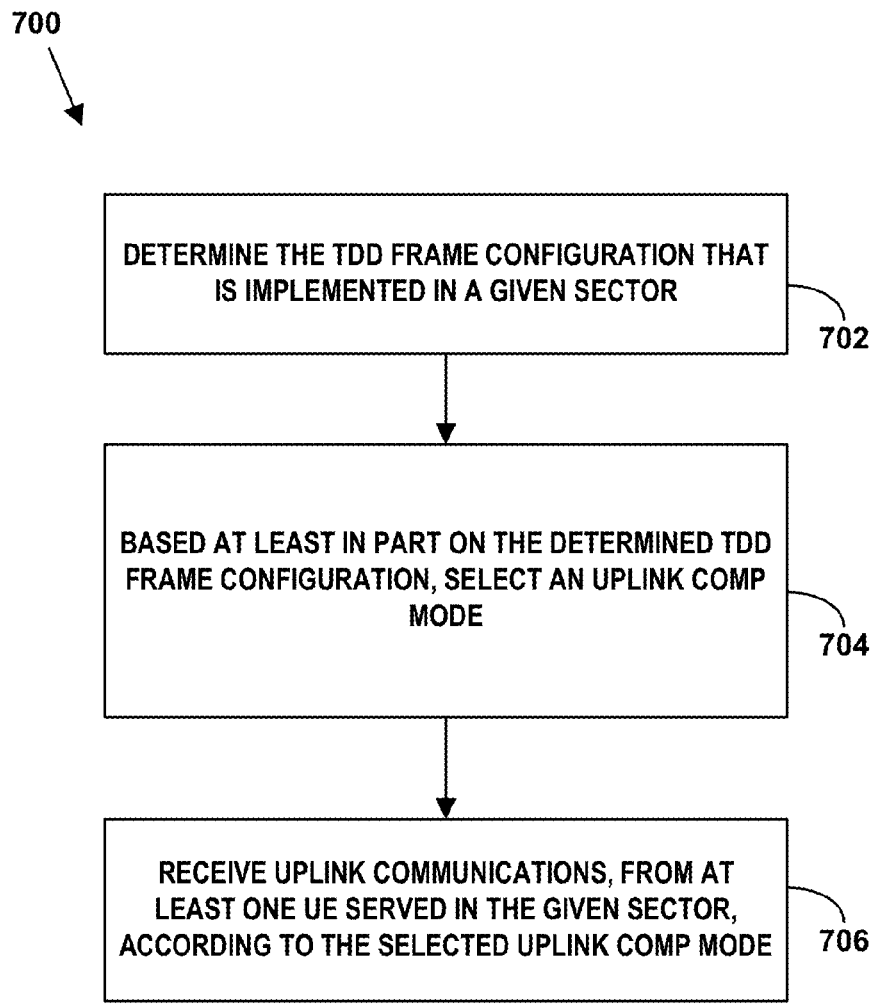
FIG. 7 is a flow chart illustrating a method for selecting an uplink CoMP mode based at least in part on TDD frame configuration, according to an exemplary embodiment.

For example, FIG. 7 is a flow chart illustrating a method 700 for selecting an uplink CoMP mode based at least in part on TDD frame configuration, according to an exemplary embodiment. More specifically, an eNodeB may determine the TDD frame configuration that is implemented in a given sector, as shown by block 702. Then, based at least in part on the determined TDD frame configuration, the eNodeB may select an uplink coordinated multipoint (CoMP) mode from a plurality of uplink CoMP modes, as shown by block 704. The CoMP mode may be selected for a particular UE, or for all UEs operating in the given sector, depending upon the particular implementation. The eNodeB may then receiving uplink communications, from at least one UE served in the given sector, according to the selected uplink CoMP mode, as shown by block 706. Further, when the selected uplink CoMP mode involves coordination between the given sector and one or more of a plurality of other sectors the given sector's CoMP group, the eNodeB may implement a method such as that described in reference to FIG. 3, to select the secondary eNodeB or eNodeBs to include in the CoMP group for the UE.

Turning to the specific manner that the TDD frame configuration is taken into consideration, consider that different TDD frame configurations may differ in the distribution of resources between the uplink and downlink slots. For example, consider the seven different frame configurations that are currently defined for LTE, which are shown in FIG. 2. As shown, LTE frame configurations 0 to 6 may provide various distributions of resources between the uplink and downlink. As an example, frame configuration 1 designates four downlink subframes, and four uplink subframes, per frame. Frame configuration 2 designates six downlink subframes, and only two uplink subframes, per frame. As such, implementing frame configuration 2 reduces the amount of uplink bandwidth that is available in a sector, as compared to when frame configuration 1 is implemented. Other examples of differing resource distribution between the uplink and downlink also exist.

By reducing the maximum level of uplink traffic in a given sector, frame configuration 2 may also reduce the maximum amount of demand that uplink CoMP can place on the backhaul network as a result of UEs that are served by the given sector, as compared to when frame configuration 1 is implemented. Accordingly, an eNodeB may adjust the uplink CoMP mode or modes that are selected for UEs it serves based at least in part on the TDD frame configuration that is implemented in the respective sectors in which the UEs are served. Thus, an exemplary method may further involve the serving eNodeB determining the TDD frame configuration for the UE's serving sector. The serving eNodeB may then consider the combination of the determined TDD frame configuration in a sector serving a UE, as well as the application type(s) in secondary sectors from the CoMP group that would provide uplink CoMP for a UE, and possibly other factors as well, when selecting an uplink CoMP mode for a UE in the serving sector.

More specifically, when the TDD frame configuration for a particular sector allocates a lesser amount of bandwidth to the uplink (e.g., a lesser number of subframes per frame), a serving eNodeB for the sector may be more likely to select an uplink CoMP mode that would theoretically place a greater demand on the backhaul network. For example, if the TDD frame configuration for a given sector reduces the total bandwidth available for uplink communications in the given sector, then the serving eNodeB may be more likely to select an uplink CoMP mode that involves centralized joint processing, for UEs that are operating in the given sector.

In practice, the serving eNodeB may take a given sector's TDD frame configuration into account by adjusting the way in which other factors are applied in the process of selecting the uplink CoMP mode. In this regard, the eNodeB may adjust the uplink CoMP selection process for all UEs in a given sector according to the sector's TDD frame configuration. For example, consider a first sector (sector A) that is using frame configuration 1, and a second sector (sector B) that is using frame configuration 2. Sector A thus has four uplink subframes per frame, while sector B only has two uplink subframes per frame. Thus, if all uplink subframes are being utilized in both sector A and sector B, the amount of uplink traffic sector B during a given time period will be half of that in sector B during the same time period. Since the maximum uplink traffic level is lower in Sector B, the serving eNodeB(s) for sectors A and B may adjust the processes for selecting a UE's uplink CoMP mode based on the application type in other sectors in the CoMP group that is or would serve the UE. More specifically, the selection processes for sectors A and/or B may be dynamically adjusted, such that it is more likely that a CoMP mode that involves centralized joint processing will be selected for a UE in sector B, than it is for a UE in sector A.

VIII. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
receiving, by a base station, in a first sector, an uplink signal from a user equipment (UE), wherein two or more other sectors are in a coordinated multipoint (CoMP) group with the first sector;
for each of one or more of the two or more other sectors, determining, by the base station, a corresponding application-based priority measure for the other sector, wherein the application-based priority measure is determined based on one or more types of applications having one or more service flows in the other sector;
using the one or more determined application-based priority measures as a basis for selecting at least one of the two or more other sectors in the CoMP group as a secondary sector; and
jointly processing, by the base station, the uplink signal from the UE, wherein the joint processing is based at least in part on the uplink signal received in the first sector and respective uplink signals received in each secondary sector.

2. The method of claim 1, wherein the coordinated multipoint (CoMP) is a pre-determined CoMP group.

3. The method of claim 1, wherein the base station selects only one secondary sector, and wherein the other sector having the highest corresponding application-based priority measure is selected as the secondary sector.

4. The method of claim 1, wherein the base station selects a predetermined number of secondary sectors, and wherein the other sectors having the highest corresponding application-based priority measures are selected as the secondary sectors.

5. The method of claim 1, wherein the base station selects each sector having greater than a threshold application-based priority measure as a secondary sector.

6. The method of claim 1, wherein deep packet inspection (DPI) is utilized to determine a respective application type for each of one or more service flows in a given other sector.

7. The method of claim 1, wherein determining the corresponding application-based priority measure for a given other sector comprises:
determining a priority value for each of the one or more service flows in the given other sector; and
determining application-based priority measure based at least in part on the one or more determined priority values for the one or service flows in the given other sector.

8. The method of claim 1, wherein determining the corresponding application-based priority measure for a given other sector comprises:
determining a priority classification for each of the one or more service flows in the given other sector; and
determining application-based priority measure based at least in part on the one or more determined priority classification for the one or service flows in the given other sector.

9. The method of claim 1, wherein determining the corresponding application-based priority measure for a given other sector comprises:
determining a one or more application-type statistics for service flows in the given other sector; and
determining application-based priority measure for the given other sector based at least in part on the one or more determined application-type statistics.

10. The method of claim 9, wherein determining the corresponding application-based priority measure for the given other sector comprises:
classifying each service flow as either a first application class or a second application class based on an application for which the service flow is utilized;
determining a total number of UEs using at least one service flow of the first application class in the given other sector;
determining a total number of service flows of the first application class in the given other sector; and
using both (a) the total number of UEs using at least one service flow of the first type and (b) the total number of service flows of the first type as a basis for determining the application-based priority measure for the given other sector.

11. The method of claim 9, wherein determining the corresponding application-based priority measure for the given other sector further comprises:
determining a total number of UEs using at least one service flow of the second type in the given other sector;
determining a total number of service flows of the second type in the given other sector; and
using both (a) the total number of UEs using at least one service flow of the second type and (b) the total number of service flows of the second type as a further basis for determining the application-based priority measure for the given other sector.

12. The method of claim 1, wherein the method further comprises:
for each of one or more of the other sectors, determining a received-power indication for uplink communications from the UE in the other sector; and
using the one or more determined received-power indication indications as a further basis for the selecting of at least one of the other sectors as a secondary sector.

13. A network component comprising:
a radio-frequency (RF) communication interface configured to receive an uplink signal from a user equipment (UE) in a first sector of an access network, wherein two or more other sectors are in a coordinated multipoint (CoMP) group with the first sector;
at least one backhaul communication interface for communicating with one or more second base stations;
at least one processor; and
a non-transitory computer readable medium comprising program instructions stored thereon that are executable by the at least one processor to:
for each of one or more of the two or more other sectors, determine a corresponding application-based priority measure for the other sector, wherein the application-based priority measure is determined based on one or more types of applications having one or more service flows in the other sector;
use the one or more determined application-based priority measures as a basis to select at least one of the two or more other sectors in the CoMP group as a secondary sector to provide uplink CoMP for the UE; and
jointly process the uplink signal from the UE, wherein the joint processing is based at least in part on the uplink signal received in the first sector and respective uplink signals received in each secondary sector.

14. The network component claim 13, wherein up to a predetermined number of the other sectors having the highest corresponding application-based priority measures are selected as the secondary sectors.

15. The network component claim 13, wherein each other sector for which the determined application-based priority measure is greater than a threshold measure, is selected as a secondary sector.

16. The network component claim 13, wherein deep packet inspection (DPI) is utilized to determine a respective application type for each of one or more service flows in a given other sector.

17. The network component claim 13, wherein the program instructions that are executable to determine the corresponding application-based priority measure for a given other sector comprise program instructions stored on the non-transitory computer readable medium and executable by the at least one processor to:
determine a priority value for each of the one or more service flows in the given other sector; and
determine an application-based priority measure based at least in part on the one or more determined priority values for the one or service flows in the given other sector.

18. The network component claim 13, wherein the program instructions that are executable to determine the corresponding application-based priority measure for a given other sector comprise program instructions stored on the non-transitory computer readable medium and executable by the at least one processor to:
determine one or more application-type statistics for service flows in the given other sector; and
determine the application-based priority measure for the given other sector based at least in part on the one or more determined application-type statistics.

19. A method comprising:
determining, by a first base station, a time-division duplex (TDD) frame configuration that is implemented in a serving sector of a user equipment (UE);
based at least in part on the determined TDD frame configuration, the first base station selecting an uplink coordinated multipoint (CoMP) mode from a plurality of uplink CoMP modes; and
receiving, by the first base station, an uplink communication from the UE according to the selected uplink CoMP mode.

20. The method of claim 19, wherein the selected uplink CoMP mode involves coordination between the serving sector and one or more of a plurality of other sectors that are in a CoMP group with the serving sector, the method further comprising:
after selecting the uplink CoMP mode, determining, for each of one or more of the other sectors, a corresponding application-based priority measure for the other sector, wherein the application-based priority measure is determined based on one or more types of applications having one or more service flows in the other sector;
using the one or more determined application-based priority measures as a basis for selecting at least one of the two or more other sectors in the CoMP group as a secondary sector;
jointly processing, by the base station, the uplink signal from the UE, wherein the joint processing is based at least in part on the uplink signal received in the first sector and respective uplink signals received in each secondary sector.

* * * * *